(12) United States Patent
Baylot et al.

(10) Patent No.: US 8,408,617 B2
(45) Date of Patent: Apr. 2, 2013

(54) GRIPPING DEVICE FOR GRIPPING UNDERWATER PIPELINES AT THE LAYING STAGE, AND RELATIVE AUXILIARY GRIPPING TOOL

(75) Inventors: Michel Baylot, Marseilles (FR); Nicolas Boutin, Marseilles (FR)

(73) Assignee: Saipem S.p.A., San Donato Milanese (IT)

( * ) Notice: Subject to any disclaimer, the term of this patent is extended or adjusted under 35 U.S.C. 154(b) by 153 days.

(21) Appl. No.: 12/934,983

(22) PCT Filed: Mar. 25, 2009

(86) PCT No.: PCT/EP2009/053551
§ 371 (c)(1),
(2), (4) Date: Dec. 21, 2010

(87) PCT Pub. No.: WO2009/118364
PCT Pub. Date: Oct. 1, 2009

(65) Prior Publication Data
US 2011/0260481 A1    Oct. 27, 2011

(30) Foreign Application Priority Data
Mar. 28, 2008    (IT) .............................. MI2008A0542

(51) Int. Cl.
*F16L 1/12* (2006.01)
*E21B 19/10* (2006.01)
(52) U.S. Cl. ................. 294/86.4; 294/902; 405/158
(58) Field of Classification Search .............. 294/86.4, 294/102.2, 902, 194; 405/154.1, 158, 166, 405/184.4; 269/271, 280, 281, 284
See application file for complete search history.

(56) References Cited

U.S. PATENT DOCUMENTS

| 1,414,951 | A | * | 5/1922 | Hosmer et al. | 175/423 |
| 1,502,628 | A | * | 7/1924 | Hanna | 175/423 |
| 1,909,602 | A | * | 5/1933 | Young | 175/423 |
| 3,754,474 | A | | 8/1973 | Palynchuk | |
| 4,576,067 | A | | 3/1986 | Buck | |
| 5,163,665 | A | * | 11/1992 | Klearman | 269/280 |
| 5,221,099 | A | * | 6/1993 | Jansch | 279/151 |
| 5,971,086 | A | | 10/1999 | Bee et al. | |
| 6,378,399 | B1 | * | 4/2002 | Bangert | 81/57.15 |
| 6,729,803 | B1 | | 5/2004 | Baylot | |
| 2002/0189819 | A1 | | 12/2002 | Neal | |

FOREIGN PATENT DOCUMENTS

| GB | 2 336 191 | 10/1999 |
| GB | 2 364 758 | 2/2002 |
| GB | 2 370 335 | 6/2002 |
| WO | 03/074413 | 9/2003 |
| WO | 2006/027189 | 3/2006 |

OTHER PUBLICATIONS

International Search Report and Written Opinion of the International Searching Authority mailed Jun. 22, 2009 in connection with International Application No. PCT/EP2009/053551.

* cited by examiner

*Primary Examiner* — Dean Kramer
(74) *Attorney, Agent, or Firm* — Workman Nydegger

(57) ABSTRACT

A gripping device, for gripping underwater pipelines at the laying stage, has jaws that are pressed onto a pipeline extending along an axis-substantially parallel to a laying direction, and have respective friction pads that are brought cyclically into contact with the outer face of the pipeline; and auxiliary gripping tools, which have panels for covering respective friction pads, and are selectively connectable to the jaws to increase grip between the jaws and the pipeline.

46 Claims, 5 Drawing Sheets

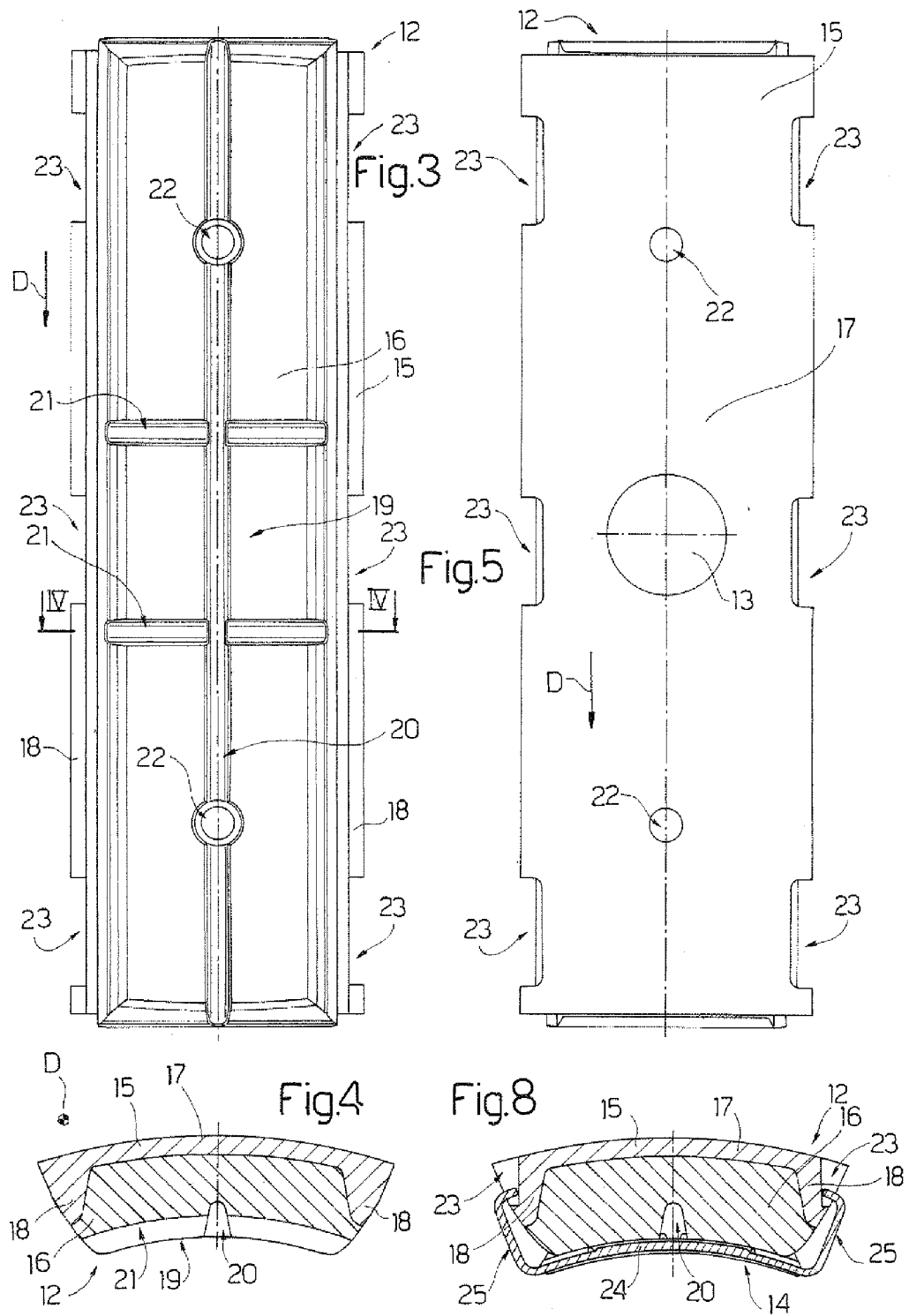

GRIPPING DEVICE FOR GRIPPING UNDERWATER PIPELINES AT THE LAYING STAGE, AND RELATIVE AUXILIARY GRIPPING TOOL

TECHNICAL FIELD

The present invention relates to a gripping device for gripping an underwater pipeline at the laying stage.

More specifically, the present invention relates to a gripping device comprising jaws, which are pressed onto a pipeline extending along an axis substantially parallel to the laying direction; and each jaw comprises a friction pad that is brought cyclically into contact with the outer face of the pipeline.

BACKGROUND ART

An underwater pipeline is normally assembled on board a laying vessel, from which it is laid directly as it is assembled. The pipeline itself comprises a number of pipes joined to total lengths of hundreds of kilometers. The pipes are of normally 12-meter standard length, and relatively large diameters ranging between 0.2 and 1.5 meters, and each comprise a steel cylinder, and a coating of polymer material to protect the steel cylinder from corrosion and heat loss.

The pipes are joined at on-land installations into multiple-standard-length pipes, as well as on laying vessels, on which standard-length or multiple-standard-length pipes are joined to others, in turn already joined to other pipes to form the pipeline, which is then laid on the sea bed by the laying vessel.

The assembly method comprises a series of assembly jobs performed on an assembly system. Generally speaking, "assembly work" is intended to mean both joining work, such as welding, and auxiliary work, such as non-destructive weld testing and preparation for further joining work.

Underwater pipelines are currently assembled and laid by laying vessels using two methods, each of which is preferable to other depending on the depth of the sea bed.

A first method is to construct the pipeline on a vertical assembly line, and to lay it in a substantially vertical position, so the portion of the pipeline between the vessel and the bed assumes a J shape. This method is particularly suitable for laying underwater pipelines in very deep water.

A second method is to construct the pipeline on a substantially horizontal assembly line, and to lay it using a laying device which, in the work configuration, serves to guide and support the pipeline along a curved path having a first portion above the surface of the sea, and a second portion below the surface. Using this method, the pipeline assumes an S shape between the laying vessel and the sea bed.

In both the above known methods, the pipeline is advanced with respect to the vessel in a "jogging movement", which includes both fast-forward movements of the pipeline with respect to the vessel, alternating with slow-forward movements, during which the assembly work is carried out; and fast-forward movements of the pipeline with respect to the vessel, alternating with stops, during which the assembly work is carried out.

Regardless of which laying method is used, relative movement between the pipeline and the vessel must always be controlled using one or more gripping devices.

Gripping devices come in different types. A first comprises jaws that are movable selectively to and from the pipeline to grip it cyclically. Some gripping devices of this type are movable along the axis of the pipeline to grip it successively and accompany it as it moves forward.

A gripping device of this type is described in Patent Applications GB 2,364,758, GB 2,370,335 and WO 2006/027189.

Another type of gripping device comprises so-called track or crawler type tensioners, as described in Patent Application WO 03/074413. Track or crawler type tensioners comprise tracks which grip the pipeline and extend parallel to each other and to the pipeline; and each track comprises jaws hinged to one another and which cyclically grip the pipeline.

Grip, i.e. the ability to hold the pipeline firmly with no movement with respect to the jaws, substantially depends on the amount of friction between the jaws and the pipeline, the pressure exerted by the jaws on the pipeline, and the overall contact surface area between the jaws and the pipeline.

There is a limit, however, to the pressure that can be exerted by the jaws on the pipeline without damaging the pipeline at the grip area. As stated, each jaw comprises a friction pad, which is made of polymer material and serves to adapt to any unevenness along the pipeline, and to distribute pressure equally along the whole contact surface area and between the various jaws. Being deformable, the friction pad also prevents damaging the pipeline, particularly its protective polymer coating.

Despite the undisputed effectiveness of known gripping devices, particularly critical operating conditions call for increased grip to prevent relative slide between the pipeline and jaws. For example, some pipelines are exceptionally heavy, by comprising a secondary pipeline lining a main pipeline (pipe in pipe), and also afford a small grip surface area.

Moreover, as opposed to be constant, friction between the friction pad and the pipeline depends on the condition of the mutually contacting surfaces: wet, dry, dirty, clean, greasy, etc.

Another critical operating condition is the depth of the laying bed: a long portion of pipeline suspended between the laying bed and the gripping device exerts severe pull on the gripping device.

Many operating conditions therefore call for increasing the size of the jaws, but even this has its physical limits.

By way of a solution to the problem, friction pads have been proposed, made of polymer material in which aluminium bosses are embedded to improve grip. One example of this is described in U.S. Pat. No. 3,754,474, in which grip is enhanced by including bosses in the polymer material.

This technique is not without its drawbacks, however, such as rapid deterioration of the friction pads caused by including the metal bosses, and the very real risk, in some cases, of damaging the protective coating of the pipeline.

SUMMARY OF SELECTED EMBODIMENTS

Embodiments of the invention are directed to an underwater-pipeline gripping device that is versatile and provides for firm, precise grip.

In addition, embodiments of the invention are directed to an underwater-pipeline gripping device designed for strong grip without damaging the pipeline.

According to the present invention, there is provided a gripping device for gripping underwater pipelines at the laying stage, the gripping device comprising jaws that are pressed onto a pipeline extending along an axis substantially parallel to a laying direction; each jaw comprising a friction pad that is brought cyclically into contact with the outer face of the pipeline; and the gripping device being characterized by comprising an auxiliary gripping tool, which comprises a panel for covering the friction pad, and is selectively connectable to the jaw to increase grip between the friction pad and the pipeline.

By means of the present invention, the interface between the friction pad and the pipeline can be modified as a function of operating conditions, to achieve a highly versatile gripping device.

The present invention also relates to an auxiliary gripping tool for a gripping device for gripping underwater pipelines at the laying stage.

According to the present invention, there is provided an auxiliary gripping tool for a gripping device for gripping underwater pipelines at the laying stage; the gripping device comprising jaws that are pressed onto a pipeline extending along an axis substantially parallel to a laying direction; each jaw comprising a friction pad that is brought cyclically into contact with the outer face of the pipeline; the auxiliary gripping tool being characterized by comprising a panel for covering the friction pad, and by being selectively connectable to the jaw to increase grip between the friction pad and the pipeline.

BRIEF DESCRIPTION OF THE DRAWINGS

A non-limiting embodiment of the present invention will be described by way of example with reference to the accompanying drawings, in which:

FIG. 3 shows a larger-scale front view, with parts removed for clarity, of a detail of the FIG. 2 gripping device;

FIG. 4 shows a section of the FIG. 3 detail along line IV-IV;

FIG. 5 shows a rear view, with parts removed for clarity, of the FIG. 3 detail;

FIG. 8 shows a larger-scale section of the FIG. 2 detail along line VIII-VIII;

FIG. 9 shows a larger-scale section, with parts removed for clarity, of the FIG. 7 auxiliary gripping tool in an operating configuration.

BEST MODE FOR CARRYING OUT THE INVENTION

The Laying Vessel

Figure 1:
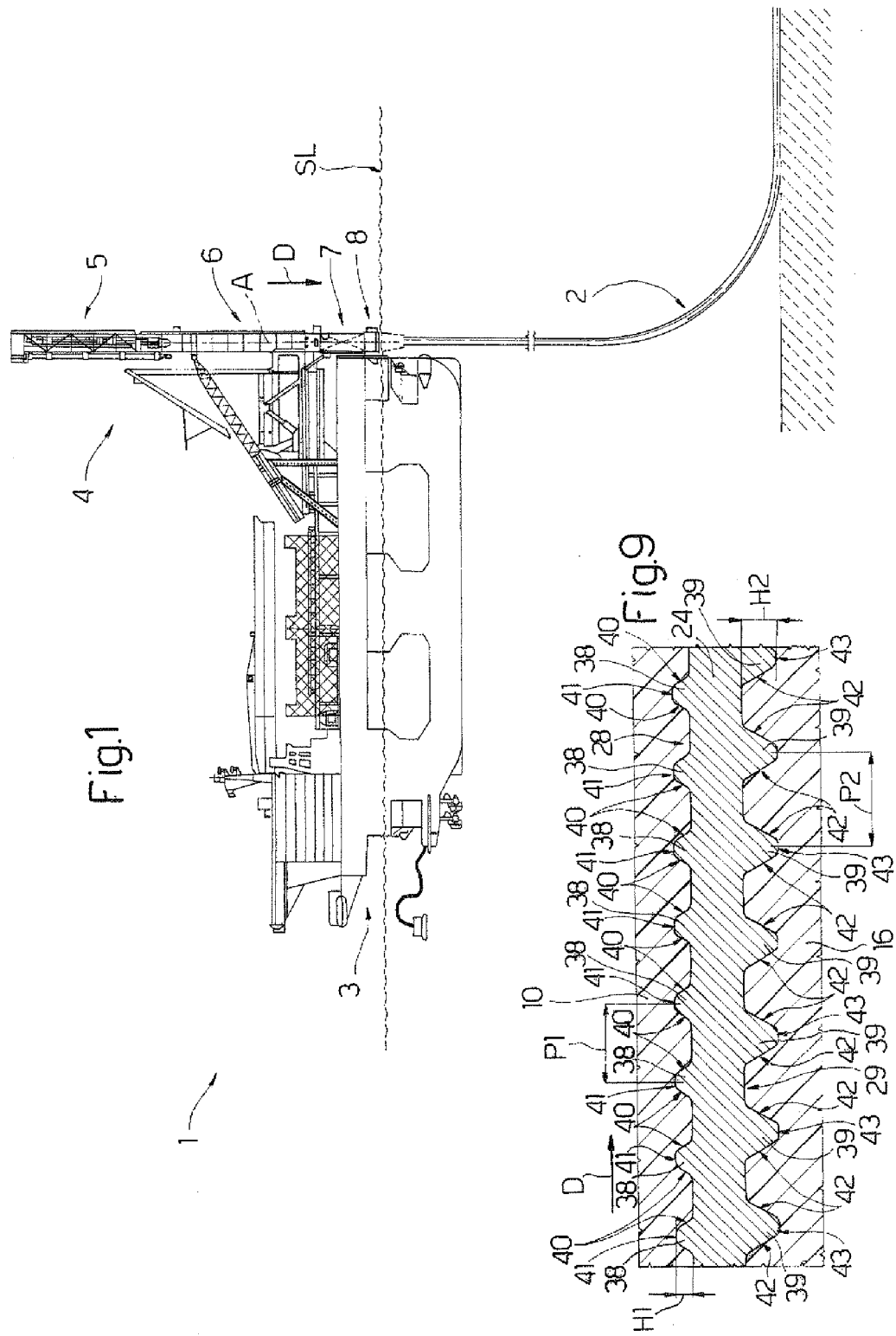
FIG. 1 shows a side view, with parts removed for clarity, of an underwater-pipeline laying vessel comprising a gripping device in accordance with the present invention.

Number 1 in FIG. 1 indicates a laying vessel for constructing and laying in the sea (SL indicates sea level) an underwater pipeline 2 comprising a number of connected pipes (not shown). Laying vessel 1 is a particular type of laying vessel to which the present invention can be applied.

Laying vessel 1 comprises a semisubmersible ship 3; and a laying tower 4 extending in a direction D, hinged to semisubmersible ship 3, and designed for J laying. Though shown in an upright position, laying tower 4 may be tilted as much as 30° to the vertical when laying pipeline 2.

Laying tower 4 comprises a top portion 5 where pipeline 2 is assembled; an intermediate portion 6 housing a crawler tensioner not shown in the drawings; and a bottom portion 7 housing a gripping device 8.

The Underwater Pipeline

Figure 2:
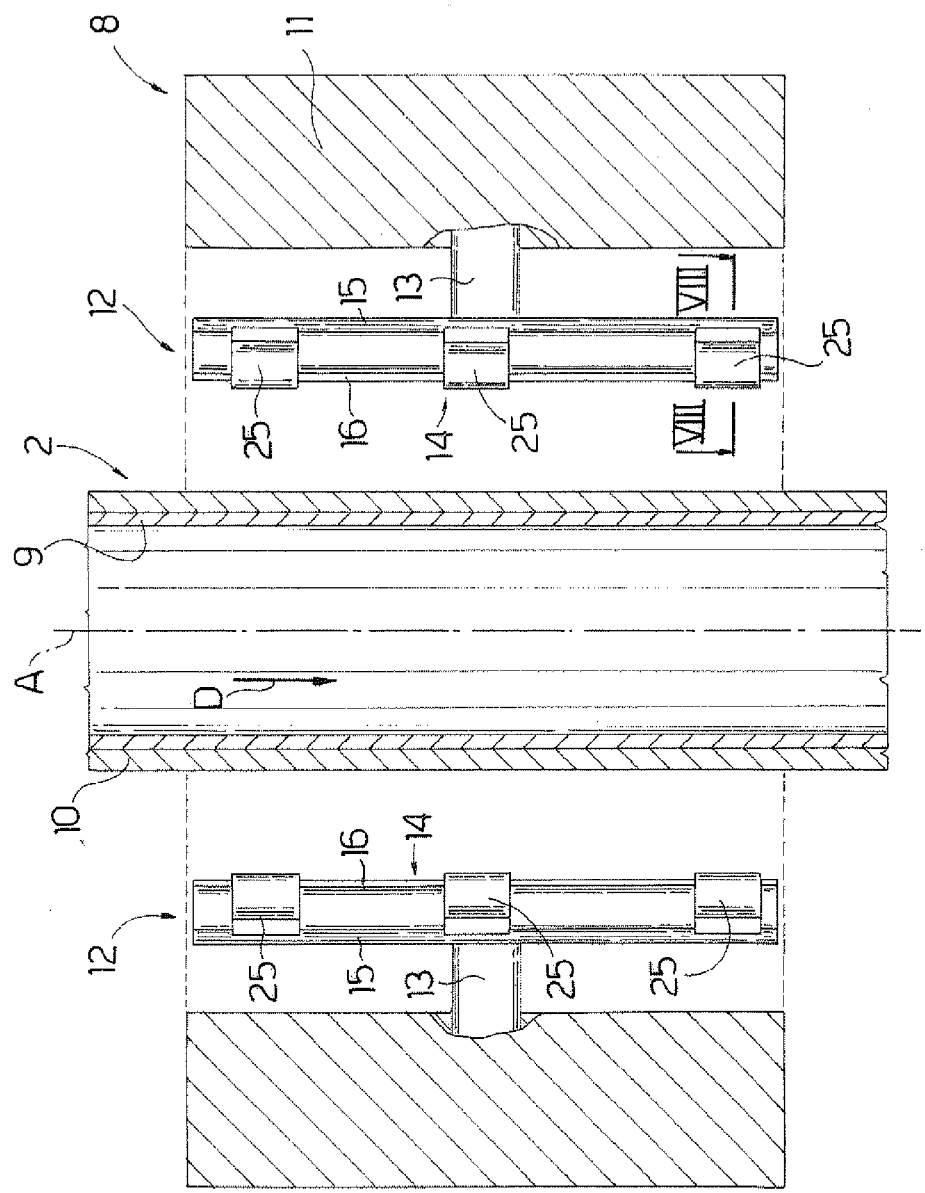
FIG. 2 shows a partly sectioned side view, with parts removed for clarity, of the gripping device according to the present invention.

With reference to FIG. 2, pipeline 2 extends along an axis A parallel to laying direction D, and comprises a metal cylinder 9, and a protective covering 10 surrounding metal cylinder 9 and made of deformable polymer material. In other words, protective covering 10 is more deformable than metal cylinder 9.

The term "protective covering" includes both relatively thin (a few millimeters thick) rustproof coatings of PP (polypropylene) or PE (polyethylene), and insulating layers which combine rustproofing and thermal insulation. The insulating layers may be as much as a few tens of a mm thick, and are normally made of PU (polyurethane) or multilayer PP (polypropylene).

Though the present description refers specifically to a conventional single underwater pipeline, it is understood that the present invention also applies to underwater pipelines comprising two pipelines, one inside the other (pipe in pipe).

The Gripping Device

With reference to FIG. 2, gripping device 8 surrounds pipeline 2 at the laying stage.

Gripping device 8 comprises an annular supporting frame 11 about axis A; a number of jaws 12 equally spaced about axis A; and a number of actuators 13, each located between supporting fame 11 and a respective jaw 12 to move relative jaw 12 to and from axis A.

Supporting frame 11 is fixed to laying tower 4 (FIG. 1) or, in a variation not shown, is fitted to laying tower 4 by a known mechanism (not shown) to move parallel to direction D.

Gripping device 8 also comprises auxiliary gripping tools 14, each selectively connectable to a respective jaw 12.

With reference to FIGS. 3 and 4, each jaw 12 extends in direction D and comprises a shoe 15 made of metallic material and in the form of a half-shell; and a friction pad 16 integral with shoe 15. With reference to FIG. 4, shoe 15 comprises a cylindrical-sector-shaped bottom wall 17; and two lateral walls 18 parallel to direction D. Friction pad 16 is made of polymer material, and covers bottom wall 17 and part of lateral walls 18. More specifically, friction pad 16 has a cylindrical-sector-shaped grip face 19 of substantially the same diameter as the outer face of pipeline 2.

With reference to FIG. 3, friction pad 16 has a longitudinal groove 20 and two transverse grooves 21 formed in the thickness of friction pad 16 on the grip face 19 side; and two through holes 22, located along longitudinal groove 20, extend through friction pad 16 and shoe 15.

Apart from longitudinal groove 20, transverse grooves 21, and holes 22, grip face 19 is smooth. In an alternative embodiment, not shown, of the present invention, the grip face has ribs crosswise to direction D.

With reference to FIG. 5, shoe 15 also comprises six openings 23 located along lateral walls 18, and which define fasteners by which to fix auxiliary gripping tool 14 to jaw 12 (FIG. 8).

With reference to FIG. 2, gripping device 8 described grips pipelines 2 with an outside diameter suited to the curvature of grip faces 19 of respective jaws 12, and, in some operating conditions, is equipped with auxiliary gripping tools 14 to increase grip between friction pads 16 and pipeline 2.

The Auxiliary Gripping Tool

Figure 6:
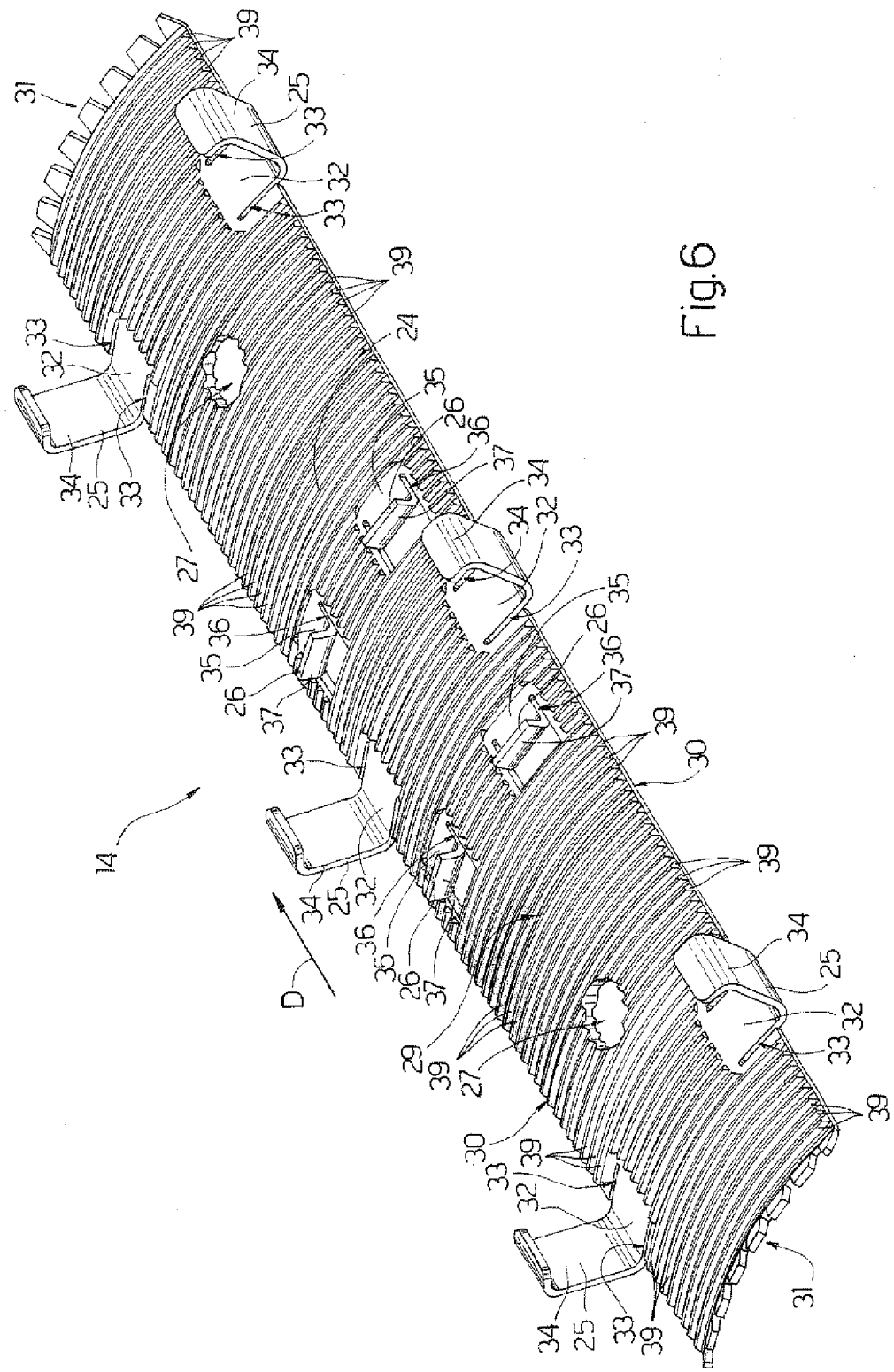
FIGS. 6 and 7 show views in perspective of an auxiliary gripping tool in accordance with the present invention.
Figure 7:
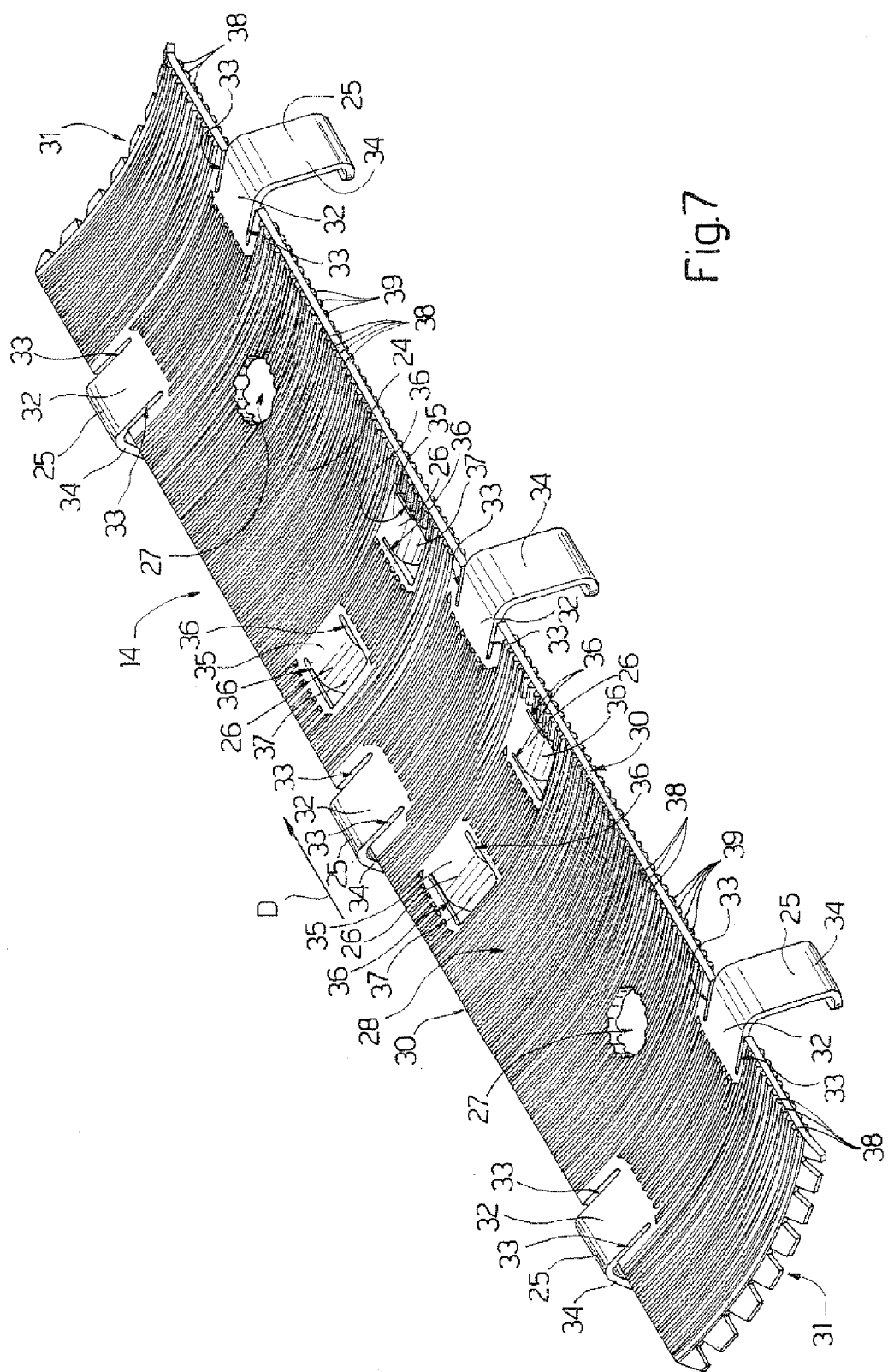

With reference to FIGS. 6 and 7, each auxiliary gripping tool 14 comprises a metal plate, in turn having a cylindrical-sector-shaped panel 24 of substantially the same curvature and size as grip face 19; six lateral tabs 25 for engaging openings 23 (FIG. 8); four inner tabs 26 for engaging transverse grooves 21; and two holes 27 which are aligned with holes 22.

Panel 24 extends over the whole of grip face 19 (FIG. 3) and comprises a concave face 28, a convex face 29, two straight longitudinal edges 30, and two curved, jagged transverse edges 31.

Lateral tabs 25 form an integral part of the plate, are equally spaced along longitudinal edges 30 of panel 24, and each comprise a portion 32 coplanar with panel 24 and separated partly from panel 24 by two slits 33; and a hook-shaped portion 34 projecting from panel 24.

Inner tabs 26 form an integral part of the plate, and are formed by cutting and bending part of panel 24. In other words, each inner tab 26 comprises a portion 35 coplanar with panel 24 and separated partly from panel 24 by two slits 36; and a portion 37 bent at a right-angle to portion 35.

With reference to FIG. 8, each lateral tab 25 engages respective opening 23 without forming an isostatic connection. That is, if the compression exerted on jaw 12 causes friction pad 16 to yield elastically, auxiliary gripping tool 14 is able to move with respect to jaw 12, and in particular with respect to shoe 15. Moreover, auxiliary gripping tool 14 is substantially flexible and can be clicked onto each jaw 12. Slits 33 and 36 make lateral tabs 25 and inner tabs 26 highly flexible, so auxiliary gripping tool 14 can not only be connected to jaw 12, but can also adapt to jaw 12 as a function of compression and the deformation of friction pad 16 caused by compression and shear stress.

Lateral tabs 25 serve to position auxiliary gripping tool 14 with respect to jaw 12 crosswise to direction D, and tabs 26 to position auxiliary gripping tool 14 with respect to jaw 12 in direction D.

With reference to FIG. 9, concave face 28 and convex face 29 of panel 24 have projections, in particular ribs, to increase the grip of auxiliary gripping tool 14 with respect to both pipeline 2 (FIG. 2) and jaw 12 (FIG. 2).

More specifically, panel 24 comprises ribs 38 along face 28, and ribs 39 along face 29. Ribs 38 and 39 extend crosswise to direction D, i.e. are perpendicular to longitudinal edges 30 (FIGS. 6 and 7).

Both ribs 38 and ribs 39 have a cross section in the form of an isosceles trapezium, and differ by ribs 39 being larger than ribs 38. Also, ribs 38 are equally spaced along face 28 with a spacing P1 ranging between 3 and 6 mm, and ribs 39 are equally spaced along face 29 with a spacing P2 ranging between 4 and 7 mm.

Ribs 38 are of a height H1, and ribs 39 of a height H2 equal to twice height H1.

More specifically, height H1 ranges between 0.5 and 2 mm, and height H2 between 1 and 4 mm.

Both ribs 38 and ribs 39 are characterized by having no sharp corners that could form cutting edges.

More specifically, each rib 38 comprises two sides sloping roughly 60°, and a top face 41; and, likewise, each rib 39 comprises two sides 42 sloping roughly 60°, and a top face 43.

As shown in FIG. 9, protective covering 10 is deformed by ribs 38, so that grip between auxiliary gripping tool 14 and pipeline 2 is also determined by indentation. And likewise, friction pad 16 is deformed when pressed against ribs 39, so that grip between jaw 12 and auxiliary gripping tool 14 is also determined by indentation.

According to the present invention, auxiliary gripping tools are available with projections of different shapes and designs, in particular different rib spacings and heights, from those described and illustrated, so a range of different auxiliary gripping tools is available from which to select the ones best suited to the type of protective covering of the pipeline and the type of friction pad. In some cases, not shown, friction is enough to ensure firm grip, so the convex face is smooth.

The present invention has numerous advantages. In particular, the versatility of the gripping device is greatly increased by the possibility of employing jaws with or without auxiliary gripping tools. More specifically, the present invention allows metallic material to be employed in contact with the pipeline, but without forgoing the advantages of employing polymer material for the friction pads.

Moreover, because the protective covering is deformed in contact with the panel, grip is also achieved by indentation.

Clearly, changes may be made to the present invention without, however, departing from the scope of the accompanying Claims. In particular, the gripping device may be a crawler tensioner, and the auxiliary gripping tools are installed on friction pads of the crawler tensioners.

The invention claimed is:

1. A gripping device for gripping underwater pipelines at the laying stage, the gripping device comprising:
 jaws that are configured to be brought cyclically into contact with an outer face of a pipeline and pressed onto the pipeline extending along an axis substantially parallel to a laying direction; each jaw comprising a friction pad; and
 an auxiliary gripping tool, which comprises a panel selectively connectable to each jaw to cover the friction pad and increase grip between each jaw and the pipeline, the auxiliary gripping tool including a first fastening means for attachment to each jaw, the first fastening means including hook-shaped lateral tabs that hook onto either side of each jaw, and each jaw including a second fastening means cooperating with the first fastening means, the second fastening means including openings formed in each jaw and defining fasteners cooperating with the hook-shaped lateral tabs.

2. The gripping device as claimed in claim 1, wherein said panel is made of metallic material, and has a concave face that is positioned in contact with the pipeline, and a convex face that is positioned in contact with the friction pad.

3. The gripping device as claimed in claim 2, wherein:
 the concave face has projections; and
 the pipeline comprises a covering of polymer material.

4. The gripping device as claimed in claim 3, wherein the panel extends in the laying direction, and comprises first ribs located substantially crosswise to the laying direction along the concave face.

5. The gripping device as claimed in claim 4, wherein the first ribs are substantially equally spaced with a first spacing in the laying direction and the first spacing ranges between about 3 mm and about 6 mm.

6. The gripping device as claimed in claim 4, wherein the first ribs are of a first height, the first height ranging between about 0.5 mm and about 2 mm.

7. The gripping device as claimed in claim 4, wherein each first rib has a cross section substantially in the form of an isosceles trapezium, and comprises two first sides sloping at a first angle, and a first top face; the first angle ranging between about 55° and about 65°.

8. The gripping device as claimed in claim 2, wherein the convex face has projections; the friction pad being made of polymer material.

9. The gripping device as claimed in claim 8, wherein the panel extends in the laying direction, and comprises second ribs located substantially crosswise to the laying direction along the convex face.

10. The gripping device as claimed in claim 9, wherein the second ribs are substantially equally spaced with a second spacing in the laying direction; the second spacing ranging between about 4 mm and about 7 mm.

11. The gripping device as claimed in claim 9, wherein the second ribs are of a second height; the second height ranging between about 1 mm and about 4 mm.

12. The gripping device as claimed in claim 9, wherein each second rib has a cross section substantially in the form of an isosceles trapezium, and comprises two second sides sloping at a second angle, and a second top face; the second angle ranging between about 55° and about 65°.

13. The gripping device as claimed in claim 1, wherein the first fastening means comprise inner tabs formed in the panel and bent substantially squarely with respect to the panel; the second fastening means comprising grooves which are substantially crosswise to the laying direction, are engaged by the inner tabs, and are formed in the friction pad.

14. An auxiliary gripping tool for a gripping device for gripping underwater pipelines at the laying stage; the gripping device including jaws that are configured to be brought into contact with an outer face of a pipeline and pressed onto the pipeline extending along an axis substantially parallel to a laying direction; each jaw comprising a friction pad, the auxiliary gripping tool comprising:
a panel selectively connectable to each jaw to cover the friction pad and increase grip between each jaw and the pipeline by means of a first fastening means for attachment to each jaw, the first fastening means including hook-shaped lateral tabs that hook onto either side of each jaw, and the first fastening means cooperating with a second fastening means on each jaw.

15. The auxiliary gripping tool as claimed in claim 14, wherein said panel is made of metallic material, and has a concave face that is positioned in contact with the outer face of the pipeline, and a convex face that is positioned in contact with the friction pad; the pipeline comprising a protective covering made of polymer material; and said friction pad being made of polymer material.

16. The auxiliary gripping tool as claimed in claim 15, wherein the concave face has projections.

17. The auxiliary gripping tool as claimed in claim 16, wherein the panel extends in the laying direction, and comprises first ribs located substantially crosswise to the laying direction along the concave face.

18. The auxiliary gripping tool as claimed in claim 17, wherein the first ribs are substantially equally spaced with a first spacing in the laying direction, and are of a first height; the first spacing ranging between about 3 mm and about 6 mm, and the first height ranging between about 0.5 mm and about 2 mm.

19. The auxiliary gripping tool as claimed in claim 17, wherein each first rib has a cross section in the form of an isosceles trapezium.

20. The auxiliary gripping tool as claimed in claim 15, wherein the convex face has projections.

21. The auxiliary gripping tool as claimed in claim 20, wherein the panel extends in the laying direction, and comprises second ribs located substantially crosswise to the laying direction along the convex face.

22. The auxiliary gripping tool as claimed in claim 21, wherein the second ribs are substantially equally spaced with a second spacing in the laying direction, and are of a second height; the second spacing ranging between about 4 mm and about 7 mm, and the second height ranging between 1 mm and about 4 mm.

23. The auxiliary gripping tool as claimed in claim 14, wherein the first fastening means comprise inner tabs formed in the panel and bent substantially squarely with respect to the panel.

24. The auxiliary gripping tool as claimed in claim 14, wherein the auxiliary gripping tool includes a metal plate.

25. A gripping device for gripping underwater pipelines at the laying stage, the gripping device comprising:
jaws that are configured to be brought cyclically into contact with an outer face of a pipeline and pressed onto the pipeline extending along an axis substantially parallel to a laying direction, each jaw comprising a friction pad; and
an auxiliary gripping tool including:
a panel for covering the friction pad, the panel selectively connectable to each jaw to increase grip between each jaw and the pipeline, the panel including:
a metal plate including:
a concave face including projections and positioned for contact with the pipeline; and
a convex face having projections and positioned for contact with the friction pad, the friction pad comprising a first polymer material.

26. The gripping device as claimed in claim 25, wherein the pipeline comprises a covering of a second polymer material.

27. The gripping device as claimed in claim 25, wherein the panel extends in the laying direction, and comprises first ribs located substantially crosswise to the laying direction along the concave face.

28. The gripping device as claimed in claim 27, wherein the first ribs are substantially equally spaced with a first spacing in the laying direction, the first spacing ranging between about 3 mm and 6 mm.

29. The gripping device as claimed in claim 27, wherein the first ribs are of a first height, the first height ranging between about 0.5 mm and about 2 mm.

30. The gripping device as claimed in claim 27, wherein each first rib includes a cross section substantially in the form of an isosceles trapezium, and comprises two first sides sloping at a first angle, and a first top face, the first angle ranging between about 55° and about 65°.

31. The gripping device as claimed in claim 25, wherein the panel extends in the laying direction, and comprises second ribs located substantially crosswise to the laying direction along the convex face.

32. The gripping device as claimed in claim 31, wherein the second ribs are substantially equally spaced with a second spacing in the laying direction, the second spacing ranging between about 4 mm and about 7 mm.

33. The gripping device as claimed in claim 31, wherein the second ribs include a second height, the second height ranging between about 1 mm and about 4 mm.

34. The gripping device as claimed in claim 31, wherein each second rib includes a cross section substantially in the form of an isosceles trapezium, and comprises two second sides sloping at a second angle, and a second top face, the second angle ranging between about 55° and about 65°.

35. The gripping device as claimed in claim 25, wherein the auxiliary gripping tool comprises first fastening means for attachment to each jaw, each jaw including a second fastening means cooperating with the first fastening means.

36. The gripping device as claimed in claim 35, wherein the first fastening means comprise hook-shaped lateral tabs that hook onto either side of each jaw, the second fastening means comprising openings formed in each jaw and defining fasteners cooperating with the lateral tabs.

37. The gripping device as claimed in claim 25, wherein the first fastening means comprise inner tabs formed in the panel and bent substantially squarely with respect to the panel; and the second fastening means comprise grooves which are substantially crosswise to the laying direction, are engaged by the inner tabs, and are formed in the friction pad.

38. An auxiliary gripping tool for a gripping device for gripping underwater pipelines at the laying stage, the gripping device including jaws that are configured to be brought into contact with an outer face of a pipeline and pressed onto the pipeline extending along an axis substantially parallel to a laying direction, each jaw comprising a friction pad, the auxiliary gripping tool comprising:
- a panel for covering the friction pad and selectively connectable to each jaw to cover the friction pad and increase grip between each jaw and the pipeline, the panel including:
  - a metal plate, the metal plate including:
    - a concave face having projections and positioned in contact with the outer face of the pipeline; and
    - a convex face having projections and positioned in contact with the friction pad; and
- wherein:
  - the pipeline comprises a protective covering made of a first polymer material; and
  - the friction pad comprises a second polymer material.

39. The auxiliary gripping tool as claimed in claim 38, wherein the panel extends substantially parallel to the laying direction, and comprises first ribs located substantially crosswise to the laying direction along the concave face.

40. The auxiliary gripping tool as claimed in claim 39, wherein the first ribs are equally spaced with a first spacing in the laying direction, and are of a first height; the first spacing ranges between 3 and 6 mm, and the first height ranges between 0.5 mm and 2 mm.

41. The auxiliary gripping tool as claimed in claim 39, wherein each first rib has a cross section substantially in the form of an isosceles trapezium.

42. The auxiliary gripping tool as claimed in claim 38, wherein the panel extends in the laying direction, and comprises second ribs located substantially crosswise to the laying direction along the convex face.

43. The auxiliary gripping tool as claimed in claim 42, wherein the second ribs are substantially equally spaced with a second spacing in the laying direction, and include a second height, the second spacing ranging between about 4 mm and about 7 mm, and the second height ranging between about 1 mm and about 4 mm.

44. The auxiliary gripping tool as claimed in claim 38, further comprising first fastening means for attachment to each jaw, which cooperate with second fastening means on each jaw.

45. The auxiliary gripping tool as claimed in claim 44, wherein the first fastening means comprise hook-shaped lateral tabs that hook onto either side of each jaw.

46. The auxiliary gripping tool as claimed in claim 44, wherein the first fastening means comprise inner tabs formed in the panel and bent substantially squarely with respect to the panel.

* * * * *